UNITED STATES PATENT OFFICE.

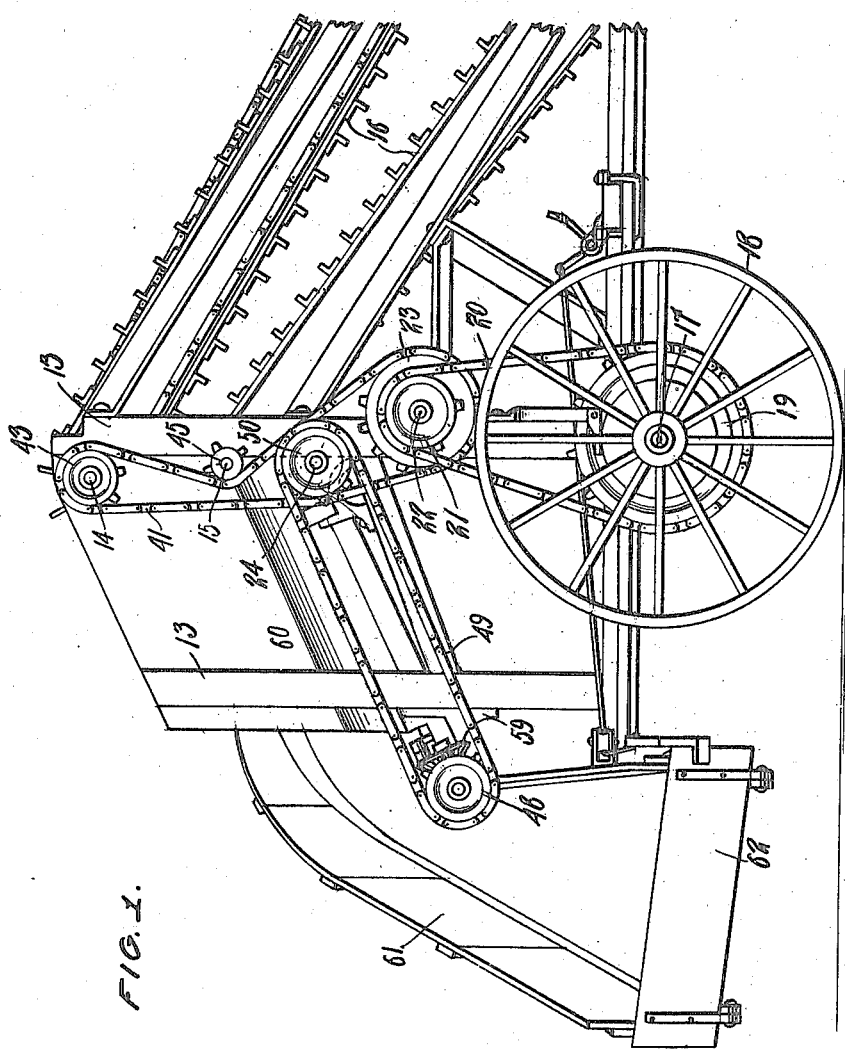

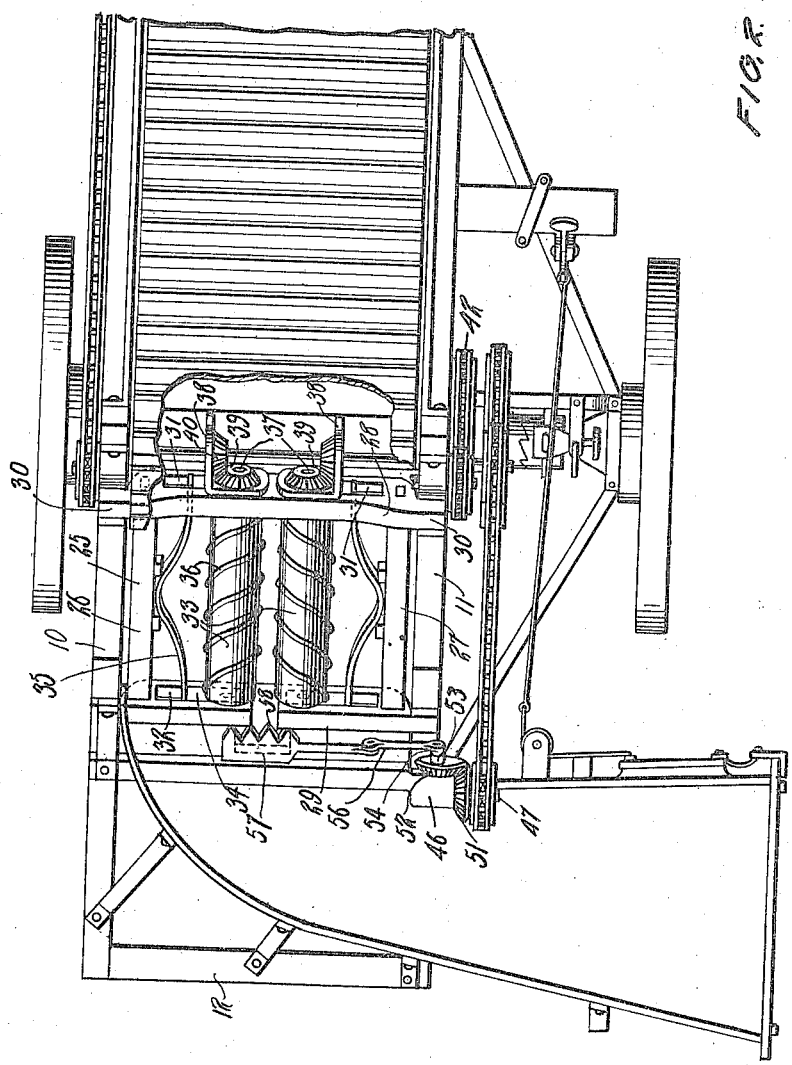

CHARLES I. DUNBLAZIER, OF MOLINE, ILLINOIS.

BEET-TOPPING DEVICE.

1,270,503. Specification of Letters Patent. Patented June 25, 1918.

Application filed August 14, 1917. Serial No. 186,175.

*To all whom it may concern:*

Be it known that I, CHARLES I. DUNBLAZIER, a citizen of the United States, residing at Moline, in the county of Rock Island and State of Illinois, have invented certain new and useful Improvements in Beet-Topping Devices, of which the following is a specification.

This invention has relation to beet harvesting machines, and has for a primary object to improve the beet topping means disclosed in my Patent Number 1,218,532, whereby the beets may be topped in accordance with the plan disclosed in the patent but in a more efficacious manner.

A still further object of the invention is to provide a topping mechanism mounted in a frame which is mounted in the main frame of the machine in a manner to permit vertical adjustment thereof for a purpose which will be presently obvious.

A still further object of the invention is to provide an improved beet topping mechanism constructed in a manner to automatically adjust itself to beets of various sizes and diameters.

In addition to the foregoing my invention comprehends improvements in the details of construction and arrangement of the parts to be hereinafter more fully described, and particularly set forth in the appended claims.

In the accompanying drawings in which similar and corresponding parts are designated by the same characters of reference throughout the several views in which they appear:—

Figure 1, is a view in side elevation of the rear end portion of my patented beet harvester illustrating the embodiment therein of my improved topping machine.

Fig. 2, is a view of the mechanism of the foregoing figure in top plan, with parts broken away to show details.

With reference to the drawings, 10 indicates generally the main frame, of which the rear portion only is disclosed in the accompanying drawings, the frame comprising a pair of spaced longitudinal members 11 connected at their rear ends by means of a transversely extending cross bar 12. Four uprights 13, are mounted upon the side frame members in rectangular formation, and a pair of superposed, transversely extending shafts 14 and 15 are journaled at their ends in bearings supported upon the two foremost uprights 13. The shafts 14 and 15 serve to support the upper ends of endless conveyers 16 between the inner surfaces of which the beets are carried in an upward direction from the digging mechanism (not shown) and unloaded at their upper ends. An axle 17 is mounted beneath the frame to support ground engaging wheels 18 and a sprocket wheel 19 is mounted for rotation with one of said wheels. An endless chain 20 operates over the sprocket 19 and over a sprocket 21 mounted on a shaft 22 which extends transversely of the machine and journaled in bearings mounted on the two foremost uprights. The shaft 22 also carries a sprocket wheel 23. A shaft 24 is extended transversely of the machine and mounted upon the two foremost uprights 13, said shaft being located between the shafts 15 and 22 and on the side of the upright opposite that occupied by the shaft 22.

My improved topping means is mounted upon a rectangular frame indicated generally at 25, and is located within the four uprights. The frame comprises a pair of longitudinally extending bars 26 connected at their forward and rear ends by means of cross bars 28 and 29 respectively. The ends of the end bar 28 project beyond the side bars 27 of the frame to form extensions 30 for a purpose which will be presently noted. Both end bars, 28 and 29 are formed with a pair of longitudinally extending slots, the slots in each bar being indicated at 31 and 32 respectively. A pair of parallel, longitudinally extending rollers 33 are located within the frame, with their ends journaled in blocks 34 slidably held within the slots 31 and 32 mentioned above. A pair of leaf springs 35 are provided at opposite sides of the rollers 33, with the intermediate portions of the springs secured to the side members 26 of the frame 25 and their ends engaging the blocks 34 whereby to urge the rollers 33 toward each other. Each roller is furthermore provided with a spiral rib 36 the ribs being wound in opposite directions as indicated in the drawings.

Each roller 33 is provided with an axle or shaft 37 which are extended at their forward ends through angular brackets 38 and said projecting ends of the shafts provided with bevel gears 39. Each of said bevel gears 39 meshes with a bevel gear 40 splined upon the shaft 24 whereby each pair of bevel gears 39 and 40 are retained in meshing engagement as the spiral rollers 33 are moved toward or away from each other during operation of the machine. The shaft 24 is operated by means of an endless chain 41 which passes around the sprocket wheel 23 and engages at opposite sides a sprocket wheel 42 mounted on the shaft 24, around the sprocket wheel 43 mounted on the upper shaft 14 and engaging a sprocket wheel 45 mounted upon the shaft 15.

The lower or rearmost end bar 29 of the auxiliary frame is provided with a lateral frame extension 46 which supports a stub shaft 47 having a sprocket wheel 48 mounted thereon and around which an endless chain 49 passes, said chain also passing around a sprocket wheel 50 mounted on a shaft 24. A bevel gear 51 is mounted on the shaft 47 for movement with the sprocket wheel 48 carried thereby said bevel gear meshing with a bevel gear 52 carried on a stub shaft also journaled in said extension 46. A pin 54 is eccentrically mounted in the bevel gear 52 and a piston rod 56, pivotally connected at one end to the eccentric pin is connected at its opposite end to a reciprocably mounted cutter blade 57 which is guided for travel in a groove formed in the lower bar 29 of the auxiliary frame. The said bar 29 is cut away as at 58 at a point adjacent the cutter and between the lower ends of the spiral rollers 33 for a purpose which will be presently noted.

The auxiliary frame carrying the topping mechanism, being supported upon the shaft 24 by means of the hanger brackets 38, it will be apparent that the frame is capable of vertical movement in the arc of a circle and in operation the frame is disposed in a rearwardly inclined position, its movement being limited by engagement of shoes 59 carried by the rear end of the auxiliary frame with the rearmost uprights 13. The oppositely extending projections formed on the top bar 28 of the frame also engage stop members formed on the foremost uprights 13 for a similar purpose.

It will be apparent that the beets as they are unloaded by operation of the endless conveyers 16 may be deposited directly upon the topping mechanism. To the end that the beets may be properly directed for operation upon in the topping mechanism, a pair of downwardly converging plates 60 are provided, secured to the uprights 13 and with their lower ends located above the space between the spiral rollers 33. A downwardly inclined chute 61 is mounted upon the rear end of the main frame of the machine with its upper end disposed to receive material falling from the topping mechanism and for collecting the same at the lower end of the chute, being held temporarily therein by means of an end gate 62 as clearly described in my former patent mentioned above.

In operation, during forward travel of the machine rotation of the ground wheels 18 is communicated by means of the chain and sprocket connection to the shafts 22 and thence to the shafts 24, 14 and 15. The material carried by and between the endless conveyers 16 is dumped upon the converging plates 60 and directed thereby to the space between the spiral rollers 33. The spiral rollers are rotated by means of power communicated from the shaft 24 through the bevel gears 39 and 40 to the rollers. Owing to the spiral rib provided on each roller the beets are worked in such a manner as to direct them, tops downward, and by the combined action of the rotation of the spiral rollers and the fact that the auxiliary frame carrying the same is inclined downwardly, the beets are carried downward and rearward into the space 58 whereby they are engaged by the reciprocable cutter 57 and the tops severed therefrom, the tops fall upon the ground and the beets are received in the chute 61 and collected. It will be apparent that inasmuch as the spiral rollers 33 are resiliently urged toward each other, they are permitted to separate to a greater or less degree by the engagement of beets therebetween depending upon the size of the beets thereby insuring that the same amount of beet tops or foliage will be severed from each beet regardless of the size thereof.

While I have illustrated and described my invention with some degree of particularity I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. In a beet harvester, the combination of a topping means including a frame pivotally mounted for vertical movement a pair of spirally ribbed rollers mounted therein for movement toward and away from each other, resilient elements for urging the rollers toward each other, means for rotating the rollers in opposite directions, and a cutting means located at one end roller and therebetween for severing the tops from the beets.

2. In a beet harvester, the combination of a topping mechanism including a frame, a horizontal shaft pivotally supporting one end of the frame to permit vertical adjustment thereof, a pair of bevel gears mounted on said shaft, a pair of spirally ribbed rollers mounted in the frame for movement toward and away from each other, a bevel gear rotatable with each roller for engagement with one of the bevel gears of the shaft, means for retaining the bevel gears in engagement as the rollers are adjusted toward or away from each, a resilient means for urging the rollers toward each other, and a cutting mechanism located between and adjacent one end of the rollers to sever the tops from the beets.

In testimony whereof I affix my signature in presence of two witnesses.

CHARLES I. DUNBLAZIER.

Witnesses:
LOEY E. DUNBLAZIER,
CLARENCE J. SCHROEDER.

Copies of this patent may be obtained for five cents each, by addressing the "Commissioner of Patents, Washington, D. C."